Aug. 17, 1926.
G. H. BENNETT
GLARESHIELD FOR VEHICLES
Filed Dec. 26, 1924
1,595,987
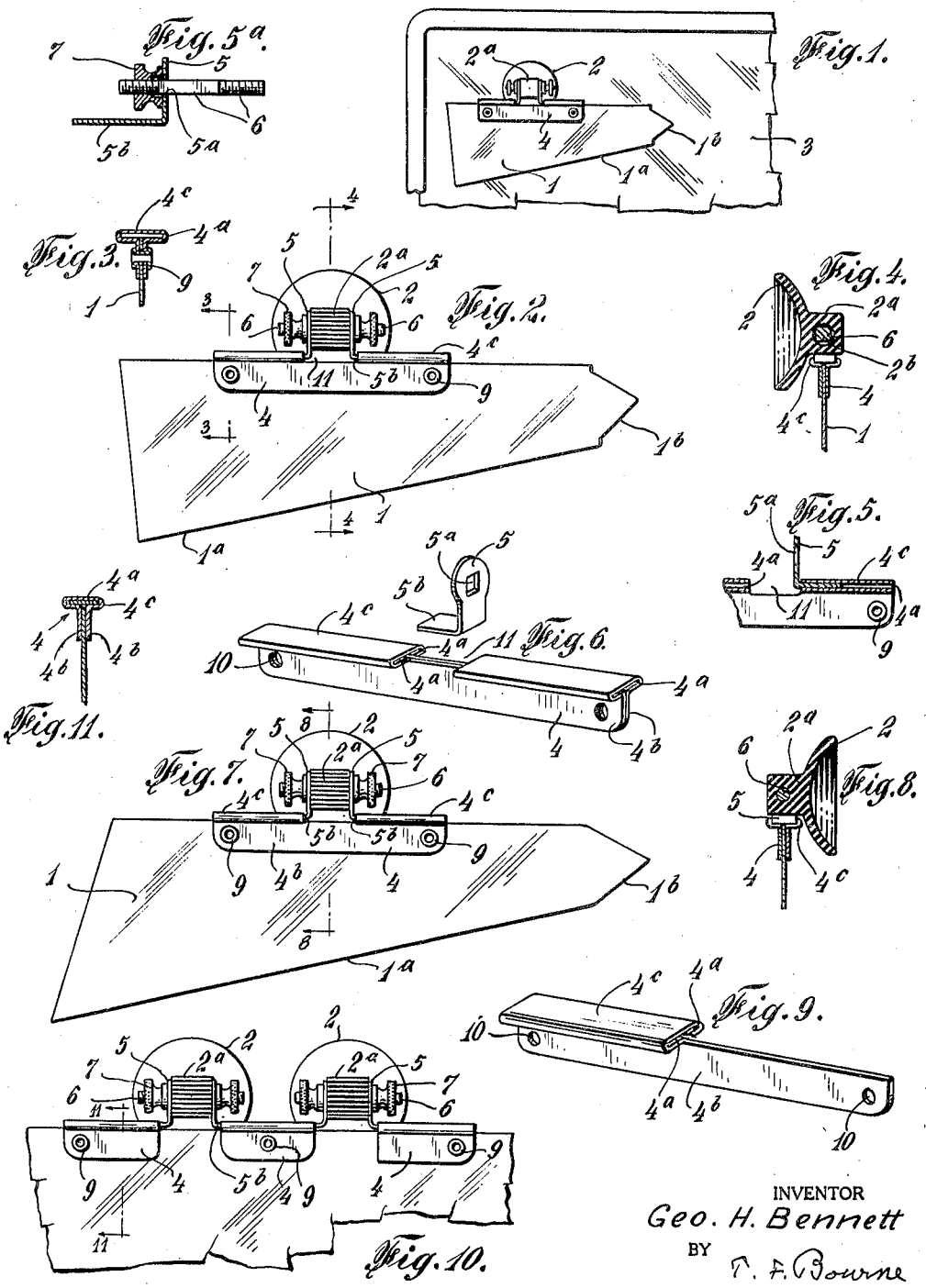
INVENTOR
Geo. H. Bennett
BY
T. F. Bourne
ATTORNEY Patented Aug. 17, 1926.

1,595,987

UNITED STATES PATENT OFFICE.

GEORGE H. BENNETT, OF NEW YORK, N. Y.

GLARESHIELD FOR VEHICLES.

Application filed December 26, 1924. Serial No. 758,061.

My invention relates to improvements in the class of shields adapted for use upon automobiles and other vehicles, and particularly upon the wind shields of automobiles, to shield the eyes of the driver from the glare of light ahead and particularly from the glare of lights from other automobiles.

The object of my invention is to provide a glare shield of the class specified which shall be simple in construction, capable of ready application to and removal from the wind shield of an automobile or other support, which may be readily adjusted to various positions before the driver and remain in set position, and which will not be liable to get out of order.

My invention comprises novel details of improvement that will be more fully hereinafter set forth and then pointed out in the claims.

Reference is to be had to the accompanying drawings forming a part hereof, wherein—

Fig. 1 is a front view illustrating my improved glare shield in position upon a wind shield;

Fig. 2 is an enlarged detail view of my improved glare shield;

Fig. 3 is a detail section on line 3, 3, in Fig. 2;

Fig. 4 is a section on line 4, 4, in Fig. 2;

Fig. 5 is a fragmentary detail section;

Fig 5$^a$ is a detail of a rod;

Fig. 6 is a detail perspective view illustrating parts of my glare shield in position for assemblage;

Fig. 7 is a front view illustrating a modification;

Fig. 8 is a section on line 8, 8, in Fig. 7;

Fig. 9 is a perspective detail of part of Fig. 7;

Fig. 10 is a detail view of another modification; and

Fig. 11 is a section on line 11, 11, in Fig. 10.

Similar numerals of reference indicate corresponding parts in the several views.

The glare shield 1 may be of any suitable material, such as celluloid, glass or analogous material, tinted or colored to be translucent and yet prevent the direct rays of artificial lights and of the sun from striking the eyes of the driver of an automobile or other vehicle. At 2 is indicated a suction cup of any well known variety and of such a character that when pressed against the glass 3 of a wind shield or other support the cup will adhere thereto by the suctional action, well known in the art. I provide means for supporting the glare shield 1 from the suction cup 2 in such a manner that the glare shield may be supported in any desired position relatively to the glass or other support 3 and may be retained securely in such position upon the suction cup. Upon the glare shield 1 I mount one or more retainers or clips 4 adapted to receive brackets or supports 5 which are spaced apart to receive therebetween the hub or boss 2$^a$ that extends from the side of the suction cup 2 opposite its concave surface. The brackets 5 have holes 5$^a$ and the hub 2$^a$ has a corresponding hole 2$^b$ to register with the holes 5$^a$, whereby a rod or shaft 6 may be passed through the brackets and the hub 2$^a$ for connecting them. The rod 6 is threaded at its ends adapted to receive nuts 7, whereby the brackets 5 may be clamped against the hub 2$^a$. By preference the mid-portion of rod 6 is of angular shape, such as square (Fig. 4), with the end portions threaded for the nuts 7. The hole 2$^b$ in hub 2$^a$ may be circular so that the hub may rotate on the squared portion of rod 6. The hole 5$^a$ in one or both of the brackets 5 preferably has the same angular shape as rod 6 to keep the rod from rotating when the suction cup or the rod is rotated relatively one to the other (Fig. 4). The nut 7 is preferably recessed to receive the angular end portion of rod 6. The rod 6 may be rounded throughout, as indicated in Fig. 8. The brackets 5 have laterally disposed projections 5$^b$ adapted to fit slidably in guideways or channels 4$^a$ in the upper portions of the retainer or clip 4.

The retainer or clip 4 with its channel or channels 4$^a$ may be made by bending suitable relatively thin metal or other suitable material into desired shape, shown as substantially T-shape in cross section, providing webs 4$^b$ to which the glare shield 1 is attached and the transversely disposed head 4$^c$ containing passageway or channel 4$^a$. When the glare shield 1 is fitted in position between the webs 4$^b$ of retainer 4 the latter may be secured to the glare shield by means of eyelets or rivets at 9, passing through the shield and corresponding holes 10 in the webs of the retainer, whereby the heads 4$^c$ will be above or beyond the adjacent edge of the glare shield. The projections 5ᵇ of the brackets 5 fit slidably in the guideways 4ª, whereby when the nuts 7 are tightened on rod 6 the brackets 5 may be drawn against the hub 2ª to frictionally grip the hub to retain the shield in set position respecting the suction cup. The projections 5ᵇ will slide in the guideways 4ª to accommodate any movement of the brackets required, whereby flexing of the brackets at their junction with the projections 5ᵇ is avoided.

In the form shown in Figs. 1 to 6 the retainer 4 may be in a single piece of material, the illustration showing the webs 4ᵇ and two head portions 4ᶜ spaced apart at the intervening space 11 (Fig. 6). The length of the projections 5ᵇ respecting the width of space 11 is such that one bracket may be placed within space 11 and its projection 5ᵇ slid into one of the guideways 4ª toward the head 4ᶜ, and the other bracket 5 may be placed in the space 11, with its projection 5ᵇ extending in the direction opposite the first named projection, and the second named projection may correspondingly slide into the other guideway 4ª toward the corresponding head 4ᶜ, whereby the brackets are spaced apart to receive the hub 2ª of the suction cup therebetween. The space 11 may be formed by cutting out the appropriate part of the blank before the retainer is folded to its final shape, or the material to form the space 11 may be cut away after the retainer has been folded.

In the form shown in Figs. 7, 8 and 9 the retainer is made in two parts, each part having a web 4ᵇ on one side to which the head 4ᶜ is attached providing the guideway or channel 4ª, as illustrated in Fig. 9. One of said retainer parts will be placed upon one side of glare shield 1, and the complemental retainer part placed on the opposite side of the glare shield, said retainer parts being riveted together at 9 and so fitted on the glare shield that their heads 4ᶜ will be spaced apart to provide space therebetween, corresponding to the space 11, to receive the brackets 5 therebetween with their projections 5ᵇ in the corresponding guideways 4ª, slidably disposed therein in the manner before described.

In the form shown in Figs. 10 and 11 two or more separate retainers may be provided, spaced apart, to receive the brackets 5, said retainers each having spaced webs 4ᵇ to receive the glare shield 1 therebetween, and provided with the heads 4ᶜ having the guideways or channels 4ª to receive the projections 5ᵇ of brackets 5 slidably, as before described. As shown in Fig. 10, three retainers 4 retain two pairs of brackets for two suction cups.

In the form I have illustrated the lower edge 1ª of the glare shield extends at an angle from the left hand corner upwardly toward the right hand side of the glare shield, and at the right hand end the lower edge of the shield at 1ᵇ extends toward the edge 1ª from the tip in a direction at an obtuse angle with respect to the edge 1ª. The arrangement of the edges 1ª, 1ᵇ of the glare shield is such that the driver may see ahead for a considerable distance the entire road under the edge 1ª and may see the right hand side of the road the entire distance of one's vision under the edge 1ᵇ, which is obtained in eye focusing, so that the beginning of the edge 1ᵇ forms a half arch from the middle of the road. In so doing the perspective view of the road under the edges 1ª and 1ᵇ of the glare shield is not obstructed to the vision of the driver, while at the same time he may so position his head as to have the glare shield interposed between his eyes and brilliant lights along the road to eliminate the glare from such lights in his line of vision. The same is of advantage when driving against strong rays from the sun, such as when the sun is low in the heavens in the early morning or in the evening, or when hill climbing in an automobile.

My improved glare shield may be placed in any desired position upon a wind shield or other support, such as upon an automobile, railway car, locomotive or the like, and may be used hanging, as illustrated in Fig. 1, or the glare shield may be turned horizontally or turned upwardly when not in use. In case the wind shield or window is open or partly open the glare shield may be adjusted any desired position respecting the wind shield or window. Since the brackets 5 are loosely supported by the retainer the force applied in adjusting the glare shield from one position to another or in adjusting the nuts 7 to retain the glare shield with the desired friction respecting the suction cup enables such movements or adjustments without danger of causing weakening or fracturing of the brackets at the folded connection with the projections 5ᵇ.

Having now described my invention what I claim is:—

1. A glare shield comprising a suction cup, brackets connected with the suction cup, and retaining means located adjacent to an edge of the shield slidably connected with one of the brackets in the direction of said edge.

2. A glare shield as set forth in claim 1, in which the retaining means is provided with a guideway extending in the direction of said edge and said bracket has a projection slidably located in the guideway.

3. A glare shield comprising a suction cup, brackets connected with the suction cup and provided with lateral projections, and retaining means attached to an edge of the shield, said retaining means having spaced guideways extending in the direction of said edge and respectively slidably receiving said projections.

4. A glare shield comprising a suction cup having a hub, a rod extending through the hub, brackets supported on the rod on opposite sides of the hub, nuts upon the rod to retain the brackets in frictional connection with the hub, said brackets having laterally disposed projections, and retaining means on the shield having guideways respectively receiving the last named projections.

5. A glare shield comprising a suction cup having a hub, brackets connected to said cup on opposite sides of the hub, and a retainer attached to the shield and having spaced guideways along an edge of the shield receiving said projections.

6. A glare shield comprising a suction cup having a hub, brackets connected to said cup on opposite sides of the hub, and a retainer having a web for attachment to the shield, said web having a head provided with spaced guideways on opposite sides of the hub receiving said projections.

7. A glare shield comprising a suction cup, and means to attach the shield to the cup, said shield having a lower edge extending at an angle from the lower left hand side in the direction of the right hand side, the right hand end portion of the shield having a lower edge extending in a direction toward the first named edge at an obtuse angle to the first named edge.

GEORGE H. BENNETT.